Patented Mar. 16, 1943

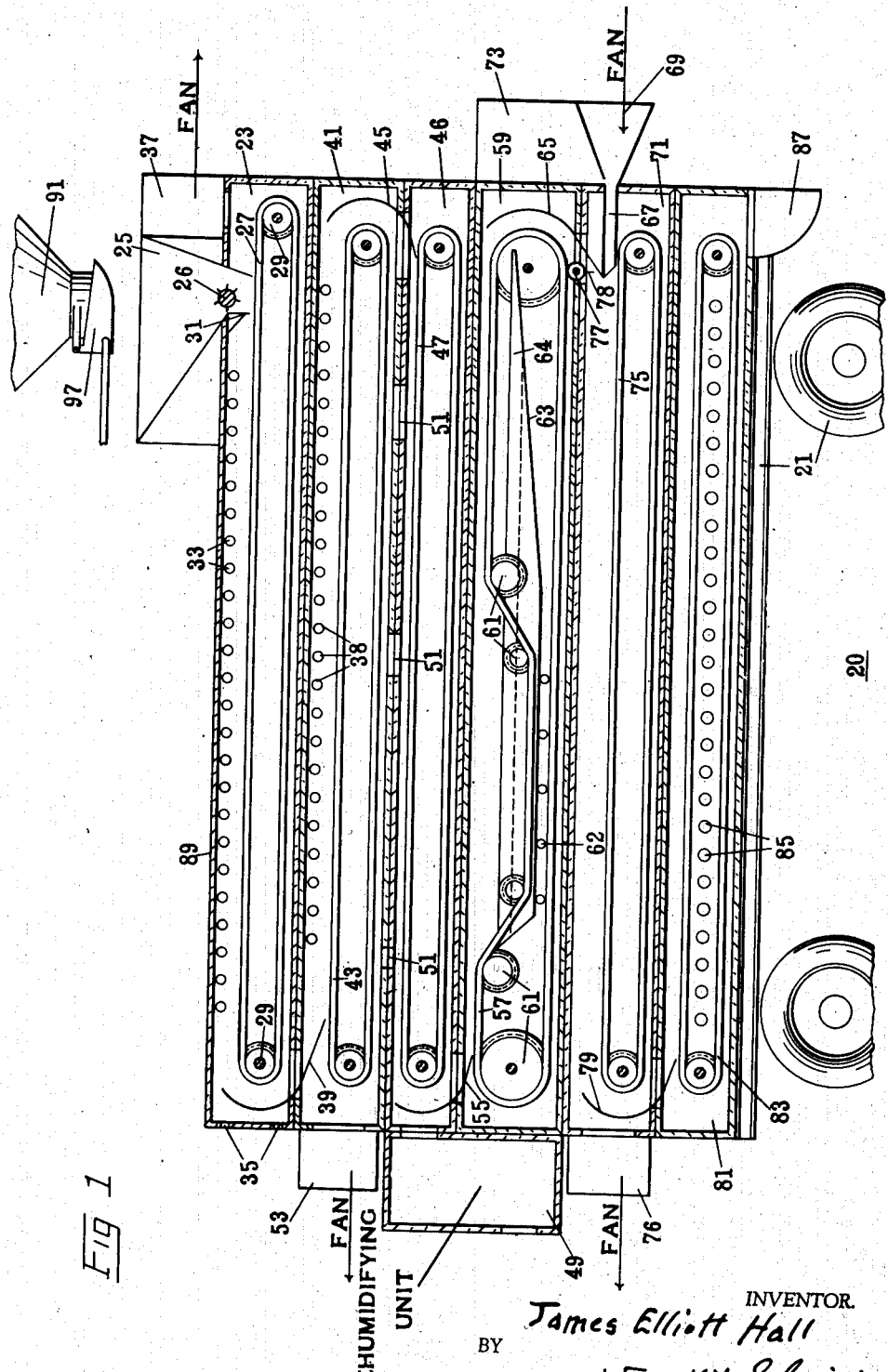

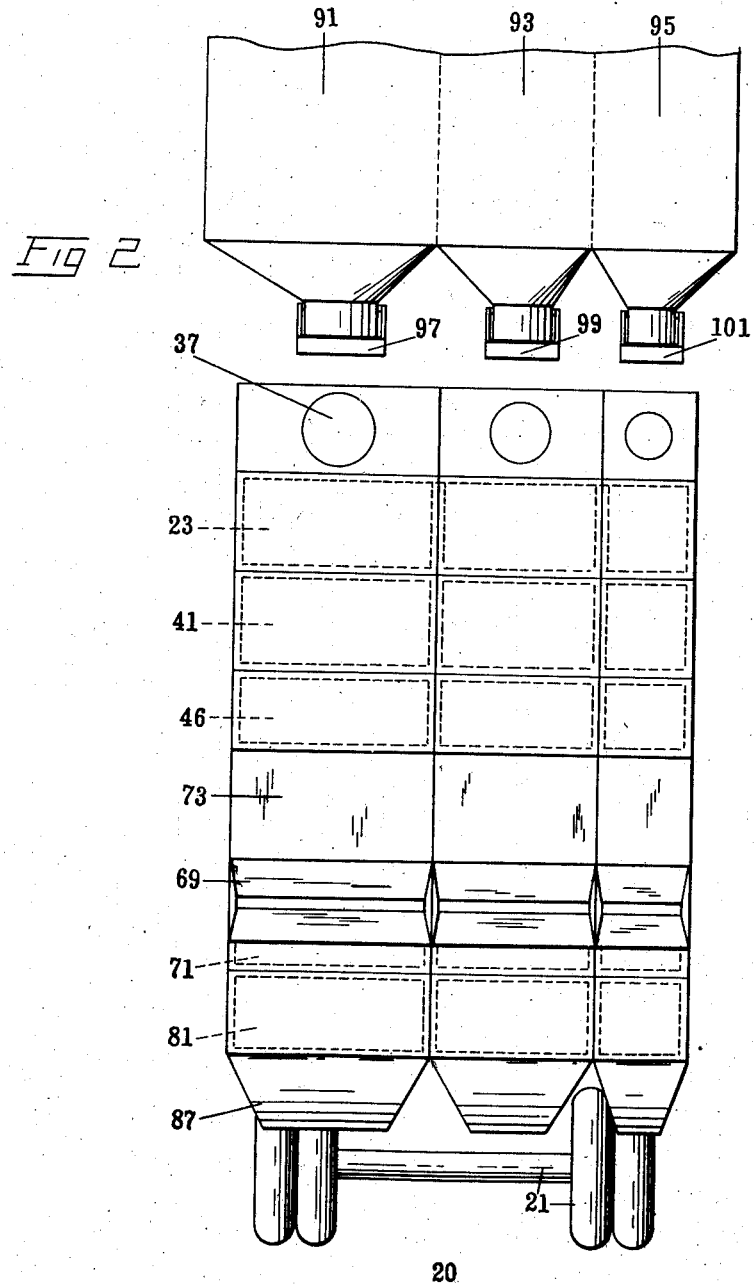

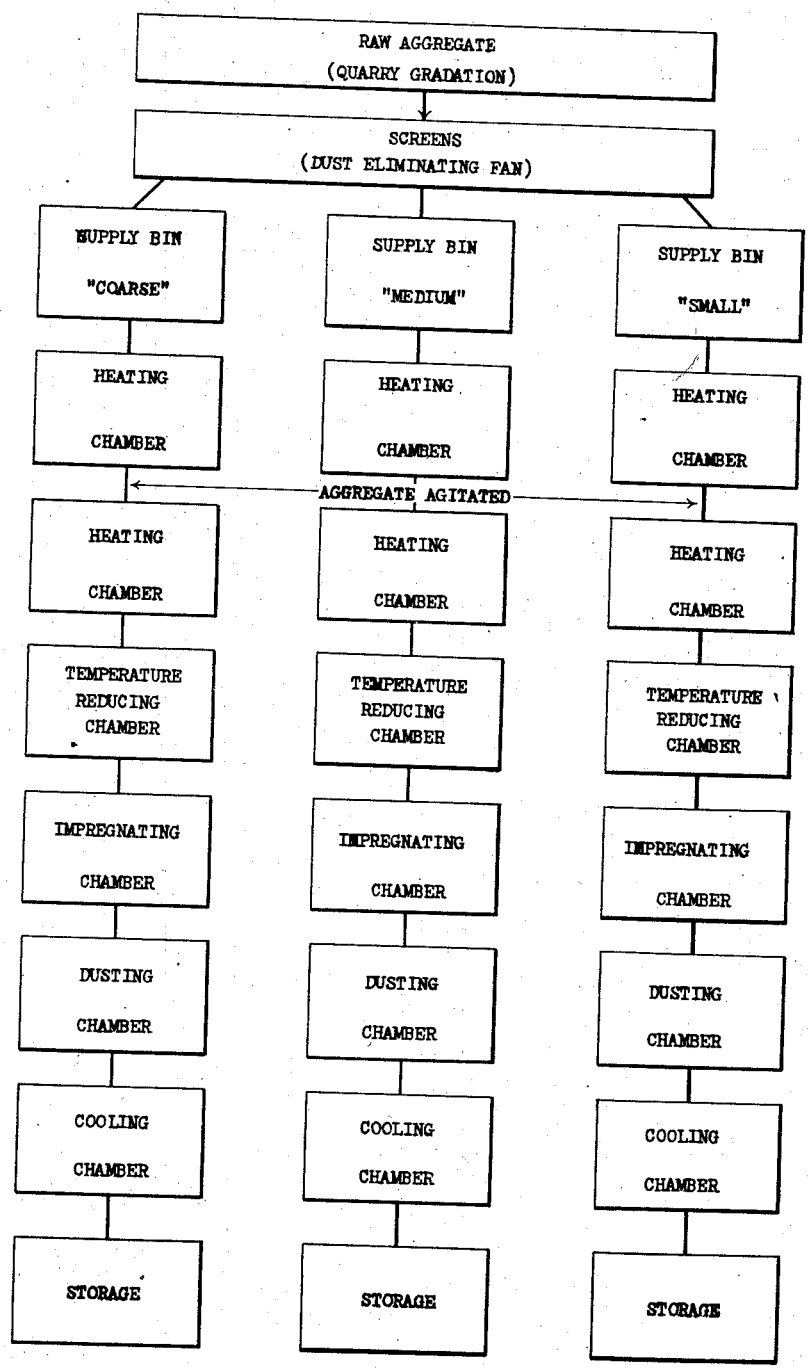

2,313,820

UNITED STATES PATENT OFFICE 2,313,820

METHOD AND APPARATUS FOR WEATHERPROOFING AGGREGATE AND THE LIKE

James Elliott Hall, Columbus, Ohio

Application May 8, 1941, Serial No. 392,516

8 Claims. (Cl. 117—100)

The invention relates to a method and apparatus for weatherproofing aggregate and the like.

It is an object of the present invention to provide a method for weatherproofing aggregate and the like wherein the aggregate is heated to substantially eliminate all moisture therefrom and then, before the aggregate has cooled sufficiently to reabsorb moisture, treating the aggregate with a suitable weatherproofing agent to seal each particle of aggregate from the moisture in the atmosphere.

It is a further object to dehydrate the aggregate and then next while the aggregate is in the dehydrated state impregnating the pores thereof with a suitable weatherproofing agent.

It is a further object of the invention to provide a method for weatherproofing aggregate and the like wherein the aggregate is heated to a suitable temperature to substantially eliminate all moisture therefrom, and then, before the heated aggregate is exposed to atmospheric air, treating the same with a suitable weatherproofing agent to seal each particle of aggregate from moisture and the atmosphere.

In carrying out the above object it is a further object, in some instances, to cause the aggregate to be agitated during the heating thereof.

It is a further object of the invention to cause relatively cool dehumidified air to pass over the heated aggregate prior to the treating thereof, to reduce the temperature of the aggregate, the necessity of the step depending on the temperature of the aggregate after heating and the volatility of the weatherproofing agent.

It is a still further object of the invention to cause the treated aggregate to be coated with suitable mineral dust, when desired.

It is also an object of the invention to cause the treated aggregate to be chilled, as a final step in the process, the necessity of this step being dependent on variable factors such as, the temperature of the treated aggregate and the volatilization temperature of the weatherproofing agent.

It is a further object of the invention first to grade the aggregate, to be coated, as to size, and then treat each of the grades of aggregate separately, such treating including dehydrating the graded aggregates by causing each of the pieces of the aggregate to be subjected to heat while in a thin layer, then while the aggregates are in a dehydrated state and before the same have cooled to such a degree as to absorb moisture, impregnating the aggregates with a suitable weatherproofing agent, and then remix the graded aggregates with one another.

Another object of the invention is to provide a machine for carrying out the aforementioned steps, said machine including a plurality of chambers, each chamber, and the mechanism therein, being capable of executing a step in the process, means being provided for advancing the aggregate through the chambers and from one chamber to the next.

It is a still further object to provide a machine in which the chambers are disposed one above the other, the aggregate being fed into the machine at the top thereof and advanced from one chamber to the next by gravity.

It is another object of the invention to provide a machine suitable for vehicular mounting, to make the same mobile, thus facilitating movement of the machine.

Other and further objects and advantages will be apparent from the following description, reference being had to the accompanying drawings wherein a preferred form of embodiment of the present invention is clearly shown.

In the drawings:

Fig. 1 is a side view, in section, of a vehicular machine, or plant, used in the weatherproofing of aggregate;

Fig. 2 is an end view of the machine shown in Fig. 1; and,

Fig. 3 is a flow chart showing the various steps in the process, in the order of execution thereof.

Referring to the drawings, a preferred form of plant 20 is shown. Such a plant is generally utilized for treating aggregate with, for example, a bituminous compound, to qualify the same as a basic ingredient in the manufacture of bituminous concrete, and the like. The plant 20 is preferably carried by a truck 21, thus providing a vehicular plant that can readily be moved to any desired location, for example, a quarry or gravel pit.

The plant 20 includes a plurality of separate, rectangular chambers, one of such chambers 23 being at the top of the plant. An endless metallic conveyer, such as a belt 27, is disposed within the chamber 23 and extends substantially the entire length and breadth of the chamber. The belt 27 is carried by a plurality of sprockets 29 that are preferably journalled on stub shafts carried by the side walls of the chamber and by a single shaft which extends across the chamber at one end thereof. This construction facilitates cleaning the chamber as well as the assembly of the mechanism therein, since when the belt 27 is removed, there is but one shaft extending across the chamber. The sprockets 29 are suitably driven, preferably by external means (not shown), to cause the belt 27 to move slowly in a counterclockwise direction.

A feeding hopper 25 is disposed on the top of, and adjacent one end of the chamber 23 and is utilized as a means for feeding aggregate, such as a mineral aggregate, to the belt 27 within the chamber. The hopper 25 may be provided with a metering device 26, in the form of a spurred shaft, for feeding the aggregate through the hopper at a desired rate of speed. The belt 27 extends beneath the egress of the hopper 25 and as aggregate is fed from the hopper 25, it falls directly upon the belt 27. An adjustable leveling blade 31, extending completely across and slightly above the belt, is disposed in the path of the moving aggregate and levels the same so that only a desired thickness of aggregate passes through the chamber 23 onto the belt 27.

A suitable number of adjustably mounted burners 33, are disposed within the chamber 23, adjacent the top thereof, and are preferably adjusted so that the flames emitted therefrom are inclined downwardly. Thus the outer ends of the flames, which curl upwardly, to some extent, do not impinge on, and thereby carbonize the top of the chamber. The burners 33 are also adjustable in the vertical plane so that the flames can be positioned any desired distance from the moving aggregate. Preferably, oil is utilized as the fuel for the burners 33 and is burned in a luminous flame to provide the maximum radiant heat therefrom. In this manner the aggregate on the belt 27 is exposed to an open and preferably luminous flame and consequently is well heated and thoroughly dried.

Secondary air for the burners 33 is supplied by a suitable number of openings 35, positioned adjacent the end of the chamber. The air is drawn into the chamber through the openings 35 and the products of combustion of the burners 33 and the moisture evaporated from the aggregate is exhausted therefrom by a suitable exhaust fan 37, disposed at the end of the chamber opposite to the air openings 35.

The heated and dried aggregate falls off the belt 27 at the end thereof and drops upon an inclined chute 39 which communicates with the next lower chamber 41. The chute 39 delivers the aggregate to a second conveyer, such as belt 43, which is disposed within chamber 41. The belt 43 is similar in all respects and is caused to move in the same manner as belt 27. The belt 43 travels in a clockwise direction to convey the aggregate through the chamber 41 (the function of chamber 41 will be described hereinafter) to the opposite end thereof where the aggregate is dropped upon an inclined chute 45 communicating with a third chamber 49. The chute 45 delivers the aggregate to a belt 47 which is similar in all respects to the aforementioned belts and travels in a counterclockwise direction within the chamber 46. It will be observed that chamber 41 is also provided with burners 38, adjacent the top thereof and similar to the burners 33. Thus, the aggregate is heated in chamber 23, agitated, due to the fall down chute 39, and further heated in chamber 41. The agitation of the aggregate causes different surfaces thereof to be exposed to the open flames and in this manner provides more thorough dehydration of the aggregate.

Secondary air for the burners 38, in chamber 41, is supplied by a forced draft dehumidifying unit 49, of conventional design, which exhausts dehumidified air into the chamber 46. This air passes over the hot dry aggregate on belt 47, and is preheated while effectively reducing the temperature of the aggregate. The heated and dehumidified air then enters the chamber 41 through a plurality of apertures 51 of graduated size, to more evenly distribute the air to the burners 38, and also through the opening around the chute 45. The excess air and products of combustion, of burners 38, are exhausted from chamber 41 by a suitable exhaust fan 53. Thus it is apparent that the dehumidified air passes countercurrent to the movement of the aggregate in chamber 49, to reduce the temperature thereof while becoming preheated to increase the efficiency of the drying operation in chamber 41. From the foregoing it will be observed that chambers 23 and 41 function as heating chambers, or ovens, while chamber 46 may be termed a temperature reduction chamber. It is desirable that the temperature of the dry aggregate is maintained above the condensation temperature of the moisture in the atmosphere and, therefore, will not absorb any moisture should the same leak into the apparatus.

The aggregate, after passing through the temperature reduction chamber 46 is discharged from the belt 43 onto an inclined chute 55 which delivers the same to a conveyer, such as a belt 57, within a chamber 59. The belt 57 travels in a clockwise direction and passes over and under suitably disposed sprockets 61 which causes the belt to be depressed in the central portion thereof and to pass through a shallow tank or vat 63. The vat 63 contains a treating compound, such as a material impervious to moisture such as a hydro-carbonaceous material, for example, caoutchouc $(C_5H_8)_x$, asphalt, bituminous compounds and I preferably employ a bituminous compound. In this manner the hot dry aggregate is immersed in the treating compound for a predetermined period of time dependent on the longitudinal rate of movement of the belt. The belt 57 emerges from the vat 63 and travels parallelly thereover for a substantial distance to permit the surplus compound to drain from the aggregate into an extended and inclined portion 64 of the vat 63.

Preferably the bitumen used in vat 63 is cut with a non-inflammable solvent to lower the viscosity thereof and thereby cause more thorough impregnation of the bitumen solution into the usually cellular structure of the aggregate. The bituminous solution is supplied from a tank, or other means, external of the chamber 59. A pump may be provided to circulate the solution, through suitable strainers and cooling apparatus, from the vat 63 to the tank to cool the same. This may be necessary in some instances since the hot aggregate immersed in the solution causes the solution to be heated to a temperature beyond that desired.

In some cases the bituminous compound is used without a solvent or cutting agent. In this event a burner 61 is provided for the vat 63 to heat the compound to liquidity when operation of the plant is initiated; thereafter the hot aggregate maintains the liquidity of the compound, thus eliminating the necessity of further external heat application.

It should be understood that in the preferred form of the present invention, that the pressure within chambers 41 and 46 is maintained sufficiently high to cause a slight leakage of dehumidified air into the impregnating chamber 59 and into the first heating chamber 23. This pressure substantially prevents fumes, emitted by the hot bitumen solution, from entering the upper chambers and also substantially prevents the air, that is laden with the evaporated moisture in compartment 23, from contacting the dehydrated aggregate prior to impregnation thereof. A further advantage is that the aggregate on belt 57 is in contact with dehumidified air prior to immersion in the vat 63.

From the foregoing it should be observed that from the time the aggregate has been heated and dehydrated until after it has been impregnated that it is subjected only to dehumidified air. Furthermore this method of drying substantially voids the aggregate particles of air due to expansion of the particles and the air and simultaneously evaporates the moisture. Since the temperature of the aggregate is substantially above the temperature of the impregnating solution, the drop in temperature of the aggregate, when entering the colder solution, creates a vacuum within the pores of the aggregate particles to substantially increase the infusion of the solution into the said particles.

After the aggregate has been impregnated, or treated, it is discharged by belt 57 onto a chute 65 which terminates above an air duct 67 in the side wall of the chamber 71.

In order to remove all aggregate particles, and solution from belt 57 a battery of revolving brushes 77 are provided. The brushes 77 revolve in a direction opposite to the direction of rotation of the belt 57 and therefore brush off any particles and compound that adhere to the belt 57. These particles are preferably directed into the mass of falling aggregate on chute 65 by a baffle plate 78.

A fan 69 is provided to blow air into the chamber 71 through the air duct 67. A supply box 73 is disposed above the duct 67 and carries a supply of dust such as mineral dust, lint or finely divided bituminous compound. The box 73 communicates with the air duct 67 so that a suction action is set up by the air stream in the duct that draws the dust into the air stream. Thus the blast emitted from the duct 67 is substantially a blast of suspended dust particles which adhere to and thereby coat the falling aggregate particles. The aggregate, after being coated, falls upon a belt 75 which moves counterclockwise within the chamber.

An exhaust fan 76, disposed at the opposite end of chamber 71 is provided to draw the surplus dust through a suitable separator (not shown) whereby the surplus dust is recovered. The fan 76 is preferably adjusted to maintain the chamber 71 substantially at atmospheric pressure so that any air leakage in this portion of the plant is from the upper chambers into the chamber 71.

The foregoing coating operation is performed to cause the aggregate particles to remain substantially separate and thereby prevent cohesion between the particles.

The belt 75 discharges the coated aggregate onto a chute 79 which communicates with a chamber 81. The aggregate is delivered from the chute 79 to a conveyer in the form of a belt 83 within the chamber 81, which belt is suitably moved in a clockwise direction. A required number of coils 85 are disposed within chamber 81 and are used as a means for carrying circulating refrigerant within the chamber 81 thereby causing the chamber to be cooled and the coated agregate to be chilled to substantially lower the temperature of the bitumen thereon to below the volatilization temperature thereof. Any suitable apparatus (not shown) is used to supply the refrigerant to the coils 85.

After the aggregate passes through the chamber 81 on the belt 83, the finished and treated product is discharged therefrom by a chute 87 to a supply pile or truck.

Preferably all of the belts in the plant can have their sprockets suitably geared together and driven by a single power plant.

The walls of all the chambers are preferably insulated, as at 89, to reduce conduction of heat from one chamber to another and also to minimize the heat losses.

Preferably one truck carries three plants 20 substantially similar to the one previously explained. These three plants are disposed side by side and are utilized since the usual road specification requires three different grade sizes of aggregate to be used. This structure may be noted in Fig. 2. Thus the truck and plant can be placed beneath bins 91, 93, and 95 which are associated with grading screens (not shown) and the aggregate of selected sizes may be weighed or measured by means of devices 97, 99 and 101 and then delivered directly into the hopper 25 of each plant, or the aggregate may be fed continuously into the hoppers 25.

In the present invention each size or grade of aggregate is conditioned individually. It is apparent that the larger sizes of aggregate require higher temperatures or longer periods of heating to dry the same than do the smaller grades. In the present invention this selective treatment is made possible and as a result the finished product is more uniform than when all sizes of aggregate are dried together. The separately treated aggregates of different sizes or grades are remixed preferably after they have been subjected to the dusting operation.

The bins, such as 91, 93 and 95, used in connection with the grading screens are standard equipment at any quarry or gravel pit and are, therefore, usually available wherever the present plant is to be used.

Fig. 3 is a flow chart showing the various steps in the process of aggregate treatment. Certain of these steps may be eliminated under various conditions. For example, the second heating chamber is not always necessary. The temperature reduction chamber may likewise be omitted under certain conditions. In this case it is preferable to supply dehumidified air to the heating chamber or chambers, and the impregnating chamber, or if dehumidified air is not supplied, to maintain the temperature of the aggregate substantially above the condensation temperature of the moisture evaporated therefrom until after the aggregate has been impregnated or otherwise treated. The dusting chamber is optional because undesirable cohesion can be usually obviated by sufficient chilling of the aggregate after treatment or when the treated aggregate is used reasonably promptly after treatment. The refrigerating, or chilling chamber is also optional according to the type of bitumen solution utilized and the temperature of the impregnated aggregate.

From the foregoing it will be seen that in order to carry out my invention the graded aggregate must, under any set of conditions, be heated in the first chamber 23 and then immediately impregnated before being cooled to a temperature where reabsorbtion of moisture is possible. The features of the invention lies in preventing the dried aggregate from absorbing any atmospheric moisture before the same is impregnated or treated with treating compound.

The present apparatus design is well adapted to meet all variable requirements of the industry. Preferably the plant is built in units which are suitably fastened together and which may be turned end for end to accommodate any number of combinations of the aforementioned chambers. In this manner if one chamber is not desired it may be removed without disturbing the efficiency of operation of the remaining portions of machine. This flexibility of construction also facilitates factory production of the machines.

It is to be understood that the term aggregate as used herein is sufficiently broad to embrace any of the usual materials used, for example, any type of petrological substance, such as rock, gravel or sand, or such substances as slag, cinders or coke breeze etc. It is apparent that the hereinbefore described process will successfully weatherproof these materials.

In general, the weatherproofed material made by this process may be utilized in the building of roads, as a basic ingredient in the compounding of asphaltic concrete or other compositions. The weatherproofed product may be used in either the hot mixed-hot laid road composition or the cold mixed-cold laid compositions, or in a combination of the two. The present product has what may be termed, a "prime coating" thereon of compounds such as a bituminous compound, which compound is impregnated by infusion or imbibition into every pore and crevice of the usually cellular structure of the material, to more completely bind the compound to the particle. In this manner the compound substantially fills the pores and crevices of the aggregate with bitumen and thereby actually prevents any subsequent entry or absorbtion of moisture therein. Therefore, the present treated aggregate is actually weatherproofed and cannot absorb moisture, neither is there any moisture within the particles. Thus roads, etc. fabricated with this treated aggregate as a basic ingredient will be substantially impervious to moisture.

While the form of embodiment of the present invention as herein disclosed constitutes a preferred form, it is to be understood that other forms might be adapted, all coming within the scope of the claims which follow.

I claim:

1. The method of conditioning aggregate for weatherproofing the same, which comprises, heating the aggregate to eliminate substantially all moisture therefrom; reducing the temperature of the heated aggregate by causing relatively cool dehydrated air to pass over the same; and then causing the dried aggregate to be impregnated with a suitable weatherproofing agent.

2. The method of conditioning aggregate for weatherproofing the same, which comprises, heating the aggregate to eliminate substantially all moisture therefrom; reducing the temperature of the heated aggregate by causing relatively cool dehydrated air to pass over the same; causing the dried aggregate to be impregnated with a suitable weatherproofing agent; and then coating the impregnated aggregate with a suitable mineral dust; and then mechanically chilling the impregnated aggregate to a temperature below the volatilization temperature of the weatherproofing agent.

3. A unitary machine for conditioning aggregate for weatherproofing the same, comprising a plurality of chambers; means associated with one of said chambers for heating aggregate therein; means associated with a second chamber for supplying relatively cool, dehumidified air thereto; means associated with a third chamber for treating the aggregate within the third chamber with a suitable weatherproofing agent; and means for progressively advancing the aggregate through said chambers in the order named.

4. A unitary machine for conditioning aggregate for weatherproofing the same, comprising a plurality of connected chambers; means associated with one of said chambers and adapted to heat the chamber for drying aggregate therein; means associated with a second of said chambers and adapted to treat the aggregate therein with a suitable weatherproofing agent; means associated with a third chamber, said last means being adapted to chill the chamber; and means associated with the chambers for progressively advancing the aggregate through said chambers in the order named.

5. In an apparatus for weatherproofing aggregate and the like, having in combination, means for dehydrating the aggregate and means for impregnating the aggregate with a suitable weatherproofing agent; means forming an enclosed conveyor for moving the aggregate from the dehydrating means to the impregnating means; and means for forcing dehumidified air into the enclosed conveyor and over the aggregate therein.

6. In an apparatus for weatherproofing aggregate and the like, having in combination, means for heating the aggregate and means for impregnating the aggregate with a suitable weatherproofing agent; means for moving the aggregate from the heating means to the impregnating means; an enclosure for all of the above mentioned means; and means for forcing dehumidified air into the enclosure.

7. In an apparatus for weatherproofing aggregate and the like having in combination, a chamber having means for dehydrating the aggregate and a chamber having means for impregnating the aggregate with a suitable weatherproofing agent; a chamber intermediate the first two mentioned chambers; means for forcing dehumidified air into the last mentioned chamber; and means for conveying the aggregate through said chambers.

8. The method of conditioning aggregate for weatherproofing the same, which comprises, causing the aggregate to be heated for a predetermined time; agitating the aggregate, and again heating the same for a predetermined period to eliminate substantially all moisture therefrom; next subjecting the hot aggregate to relatively cool dehydrated air for reducing the temperature of the aggregate and then impregnating the aggregate, while subjected to the dehydrated air with a suitable weatherproofing agent.

JAMES ELLIOTT HALL.